US011262163B2

(12) United States Patent
Mills et al.

(10) Patent No.: US 11,262,163 B2
(45) Date of Patent: Mar. 1, 2022

(54) HOLOGRAPHIC WEAPON SIGHT WITH PARABOLIC REFLECTOR

(71) Applicant: Ziel Optics, Inc., Ann Arbor, MI (US)

(72) Inventors: Kurt Douglas Mills, Stockbridge, MI (US); Fred Collin, Brighton, MI (US)

(73) Assignee: Ziel Optics, Inc., Ann Arbor, MI (US)

( * ) Notice: Subject to any disclaimer, the term of this patent is extended or adjusted under 35 U.S.C. 154(b) by 264 days.

(21) Appl. No.: 16/446,958

(22) Filed: Jun. 20, 2019

(65) Prior Publication Data
US 2020/0011638 A1 Jan. 9, 2020

Related U.S. Application Data

(60) Provisional application No. 62/694,558, filed on Jul. 6, 2018, provisional application No. 62/694,806, filed on Jul. 6, 2018.

(51) Int. Cl.
G03H 1/00 (2006.01)
F41G 1/30 (2006.01)
G02B 23/06 (2006.01)
G02B 27/42 (2006.01)

(52) U.S. Cl.
CPC .............. F41G 1/30 (2013.01); G02B 23/06 (2013.01); G02B 27/4205 (2013.01)

(58) Field of Classification Search
CPC ..... F41G 1/30; F41G 1/00; F41G 1/38; F41G 11/00; G02B 23/06; G02B 27/4205; G02B 5/32; G02B 23/00; G02B 23/02; G02B 23/10; G02B 23/105; G03H 1/00; G03H 1/0005; G03H 1/02; G03H 2001/0204; G03H 2001/0216; G03H 2223/00; G03H 2223/14

USPC .... 359/1, 13, 15, 19, 22, 28, 30, 31, 32, 33, 359/35, 362, 399, 428
See application file for complete search history.

(56) References Cited

U.S. PATENT DOCUMENTS

| | | | |
|---|---|---|---|
| 6,373,628 B1 | 4/2002 | Gunnarsson et al. | |
| 6,490,060 B1* | 12/2002 | Tai | G02B 5/32 359/15 |
| 7,145,703 B2* | 12/2006 | Sieczka | F41G 1/30 359/15 |
| 7,796,329 B2* | 9/2010 | Dobschal | F41G 1/30 359/399 |
| 9,482,803 B2* | 11/2016 | Dehmlow | F41G 1/30 |
| 2006/0162226 A1 | 7/2006 | Tai | |

FOREIGN PATENT DOCUMENTS

| | | |
|---|---|---|
| RU | 135426 U1 | 12/2013 |
| RU | 152500 U1 | 6/2015 |
| RU | 2560355 C2 | 8/2015 |

* cited by examiner

Primary Examiner — Arnel C Lavarias
(74) Attorney, Agent, or Firm — Dinsmore & Shohl LLP

(57) ABSTRACT

A holographic weapon sight with a housing that has a viewing end and an opposing target end. The viewing path is defined from the viewing end to the target end. The sight has a light source that projects a light beam along a path. The sight also has a diffractive optical element (DOE) disposed in the path of the light beam, and the DOE reconstructs an image of a reticle. The sight includes a parabolic reflector that reflects the image of the reticle. The parabolic reflector may be disposed in the viewing path such that a user views a target along the viewing path through the parabolic reflector from the viewing end.

15 Claims, 12 Drawing Sheets

HOLOGRAPHIC WEAPON SIGHT WITH PARABOLIC REFLECTOR

REFERENCE TO RELATED APPLICATION

This application claims priority to U.S. Provisional Patent Application Ser. Nos. 62/694,558 and 62/694,806, both filed Jul. 6, 2018, the entire content of both of which are incorporated herein by reference.

FIELD OF INVENTION

The present invention relates generally to sighting devices that generate a reticle or other image for aiming weapons or optical devices.

BACKGROUND OF THE INVENTION

There are several types of sights available in the market to enable a user of a weapon such as a rifle, shotgun, handgun, or submachine gun to aim these weapons. Examples of such sighting devises include laser sights, holographic sights, and "reflex" or "red dot" sights. Existing sights are made up of numerous optical components resulting in their large size, weight, energy consumption, and effort required for assembly. It would be desirable to overcome the limitations of existing sights and to provide a better solution.

SUMMARY OF THE INVENTION

A holographic weapon, sight according to one embodiment of the present disclosure has a housing with a viewing end and an opposing target end. A viewing path of the holographic weapon sight is defined from the viewing end to the target end. The sight also has a light source operable to project a light beam along a path; a diffractive optical element (DOE) disposed in the path of the light beam such that the DOE reconstructs an image of a reticle; and a parabolic reflector that reflects the image of the reticle for viewing by a user. The DOE may be selected from the group of a reflection type DOE and transmission type DOE.

In some embodiments, the holographic weapon sight further has a lens disposed along the path of the light beam between the light source and the DOE. The light source illuminates the lens, the lens focuses the light beam on the DOE, and the DOE reconstructs the image of the reticle. In some embodiments, the parabolic reflector is disposed in the viewing path such that the user views a target along the viewing path through the parabolic reflector from the viewing end.

Another embodiment of the holographic weapon sight has an adjustment optical element disposed along the path of the light beam between the DOE and the parabolic reflector. The adjustment optical element focuses the image of the reticle onto the parabolic reflector. The adjustment optical element in some embodiments may be a lens. In other embodiments, the adjustment optical element is movable along a X-axis, Y-axis and/or Z-axis for making windage, elevation and/or focus adjustments, respectively. The image of the reticle reconstructed by the DOE of the holographic weapon sight may be a diverging light beam. In some embodiments, the parabolic reflector selectively reflects wavelengths of the light source and/or the image of the reticle.

In yet another embodiment, the holographic weapon sight has a dichroic optical element disposed in the viewing path, the parabolic reflector reflects the reconstructed image toward the dichroic optical element such that the user views a target along the viewing path through the dichroic optical element from the viewing end. The embodiments in which the user is not viewing the target through the parabolic reflector, the parabolic reflector may totally reflect the incident light beam. Some embodiments may further have a lens disposed along the path of the light beam between the light source and the DOE, and the light source illuminates the lens. A mirror may be disposed in some embodiments along the path of the light beam between the lens and the DOE, such that the light source illuminates the lens, the lens focuses the light beam on the mirror, and the mirror reflects the light beam onto the DOE.

In some embodiments, the image of the reticle reconstructed by the DOE of the holographic weapon sight is a diverging light beam and/or the parabolic reflector selectively reflects wavelengths of the light source and/or the image of the reticle. The other embodiments of the holographic weapon sight may further have a dichroic optical element disposed in the viewing path and the parabolic reflector disposed in the light beam path, such that the dichroic optical element reflects the reconstructed image of the reticle from the DOE toward the parabolic mirror, the parabolic reflector collimates the reconstructed image and reflects the image back toward the dichroic optical element so that the user views a target along the viewing path through the dichroic optical element from the viewing end.

BRIEF DESCRIPTION OF THE DRAWINGS

The accompanying drawings, which are included to provide a further understanding of the disclosure and are incorporated in and constitute a part of this disclosure, illustrate embodiment (s) of the disclosure and together with the description serve to explain the principle of the disclosure. In the drawings.

DETAILED DESCRIPTION OF THE INVENTION

Figure 1A:
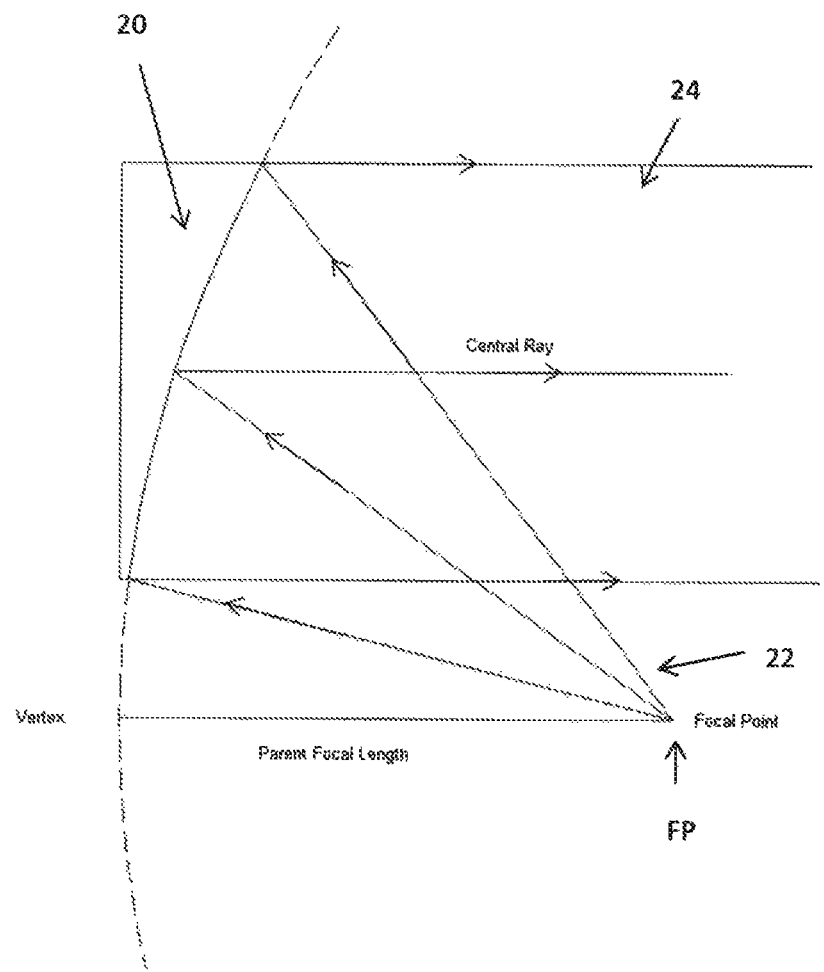
FIG. 1A shows an off-axis parabolic reflector with a focal point FP.

Reference will now be made in detail to the preferred embodiments of the present disclosure, examples of which are illustrated in the accompanying drawings. Wherever possible, the same reference numbers will be used throughout the drawings to refer to the same or like parts. In addition, although the terms used in the present disclosure are selected from generally known and used terms, some of the terms mentioned in the description of the present disclosure have been selected by the applicant at his or her discretion, the detailed meanings of which are described in relevant parts of the description herein. FIG. 1A illustrates the performance of a parabolic reflector 20 in accordance with certain embodiments of the present disclosure. The focal point of the parabolic reflector 20 is shown at FP. If a diverging light beam 22 comes from the focal point FP and illuminates the parabolic reflector 20, this light beam 22 will be reflected by the parabolic reflector 20 is such a way that a collimated reflected beam 24 will be formed. This assumes the light beam behaves generally as a point source. The reflective surface of the parabolic reflector is shaped to obey the equation:

$$y = \frac{x^2}{4F} \qquad (1)$$

where y is the vertical height above the vertex, x is the horizontal distance from the vertex, and F is the distance from the vertex to the focal point of the parabolic reflector 20.

Figure 1B:
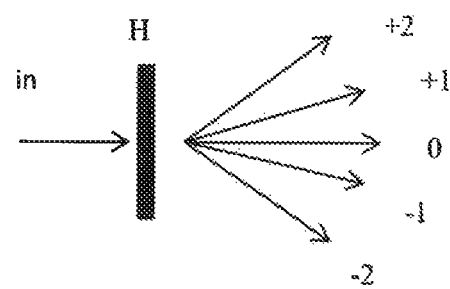
FIG. 1B shows an optical element splitting an incident light beam into many orders.

The parabolic reflector 20 may be referred to as generally collimating a beam. The term "generally" is used because if the parabolic reflector is not mathematically perfect, or the beam does not diverge from the precise focal point, the collimation may not be perfect. However, if the parabolic reflector is of reasonable quality and the beam diverges from close to the focal point FP, the resulting reflected beam 24 will be generally collimated. FIG. 1B shows an optical element splitting an incident light beam and is discussed infra in detail.

Figure 2:
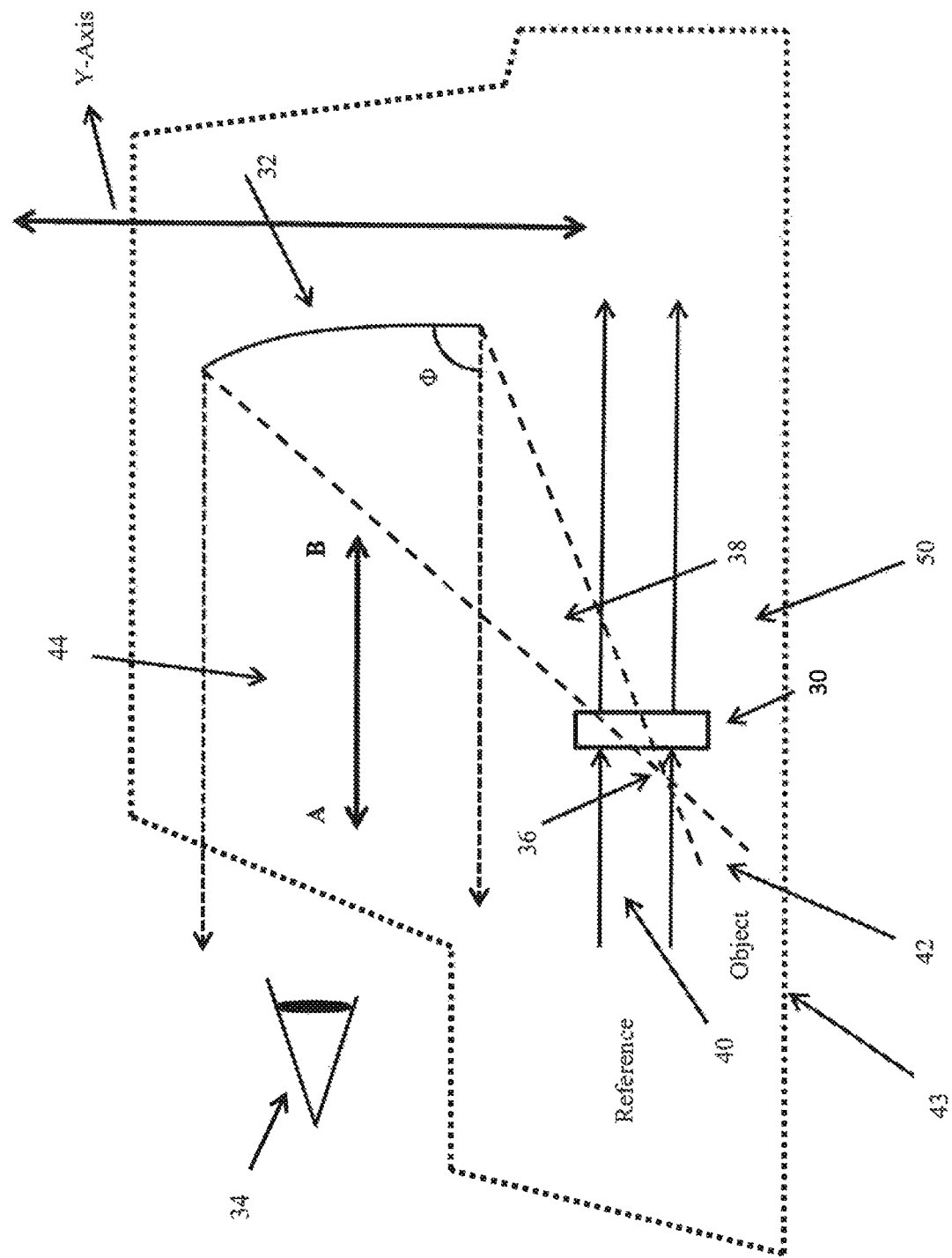
FIG. 2 is a schematic of an embodiment of a parabolic reflector sight.

FIG. 2 is a schematic view of a parabolic reflector sight 50 consisting of a holographic optical element (HOE) 30 and a light source (not shown). Embodiments of the present disclosure may use a light source, such as a regular LED, a VCSEL, a laser diode or a non-laser light source. The light source discussed in this disclosure may generate light beams of different colors (e.g. red, green, blue, orange etc.). The light source generates a reference light beam 40 and illuminates the HOE 30, which reconstructs an image that is reflected in a parabolic reflector 32 such that a user, represented at 34, can view the reflected image. In a non-limiting embodiment, the parabolic reflector 2 may have a height of about 1 inch or 25 mm such that the user 34 may clearly i.e. without any restriction, look at the target (not shown) along a viewing path AB. In other embodiments, the parabolic reflector 32 may have a different predetermined height based on the user's anatomy and/or other dimensions of the sight 50. The viewing path AB has a viewing end A near the user's eye and an opposing target end B towards the target of the parabolic reflector sight 50. Each of the embodiments of the parabolic reflector sights discussed below have a viewing path with a respective viewing end near the user's eye and an opposing target end towards the target of the parabolic reflector sight. The HOE 30 is positioned at or close to the focal point of the parabolic reflector 32. In this example, the hologram recorded on the HOE 30 is a diverging hologram with a virtual source 36 at or near the focal point. The HOE 30 may have a typical height of 2-4 mm and the preferred height is less than 5 mm. Other embodiments of the sight 50 may require the height of greater than 5 mm. The virtual source 36 is illustrated by where the dashed lines cross. The dashed lines represent the object diverging beam 38 reconstructed by the HOE 30. As shown, the parabolic reflector sight 50 is enclosed in a housing 43 and the housing is attached to a weapon (not shown). Similarly, other embodiments of the parabolic reflector/collimator sights according to the present disclosure are also enclosed in their respective housings and these housings are attached to their respective weapons. Any embodiment of the parabolic reflector sight according to the present disclosure may have a clamp (not shown) for attaching the housing to a weapon.

The arrangement of FIG. 2 results in a system that provides a generally collimated holographic image with achromatic properties. These achromatic properties mean that changes in a wavelength of the light source (not shown) do not significantly influence the position of the reticle as viewed by the user 34. As the wavelength of the light source illuminating the HOE 30 changes, the reconstructed object beam 38 will move up or down along the y-axis, but angle ϕ of the generally collimated beam 44 with respect to y-axis does not change. For small changes in the wavelength, this amount of movement along the y-axis is negligible and because the angle ϕ is not changing, this is a generally achromatic system.

In practice, the hologram's virtual source 36 may not be perfectly positioned at the focal point, which may result in a slight achromatic error due to changes in the wavelength. However, in one exemplary embodiment, the error was less than 1 minute of angle (MOA), which is acceptable for certain applications. A small position change of the HOE 30, resulting in a change of the virtual source position 36, may cause a slight change in collimation. This may be used to set a depth of focus of the parabolic reflector sight 50.

Figure 3A:
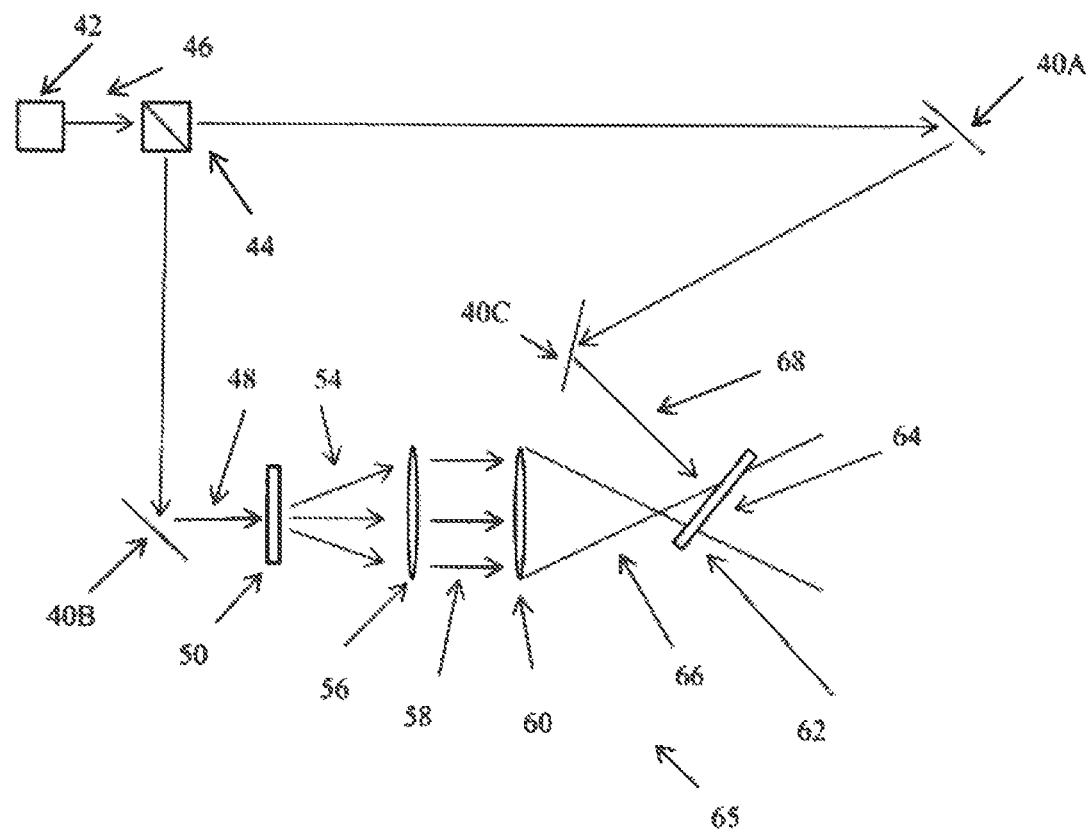
FIG. 3A is a schematic of recording a transmission type hologram.
Figure 3B:
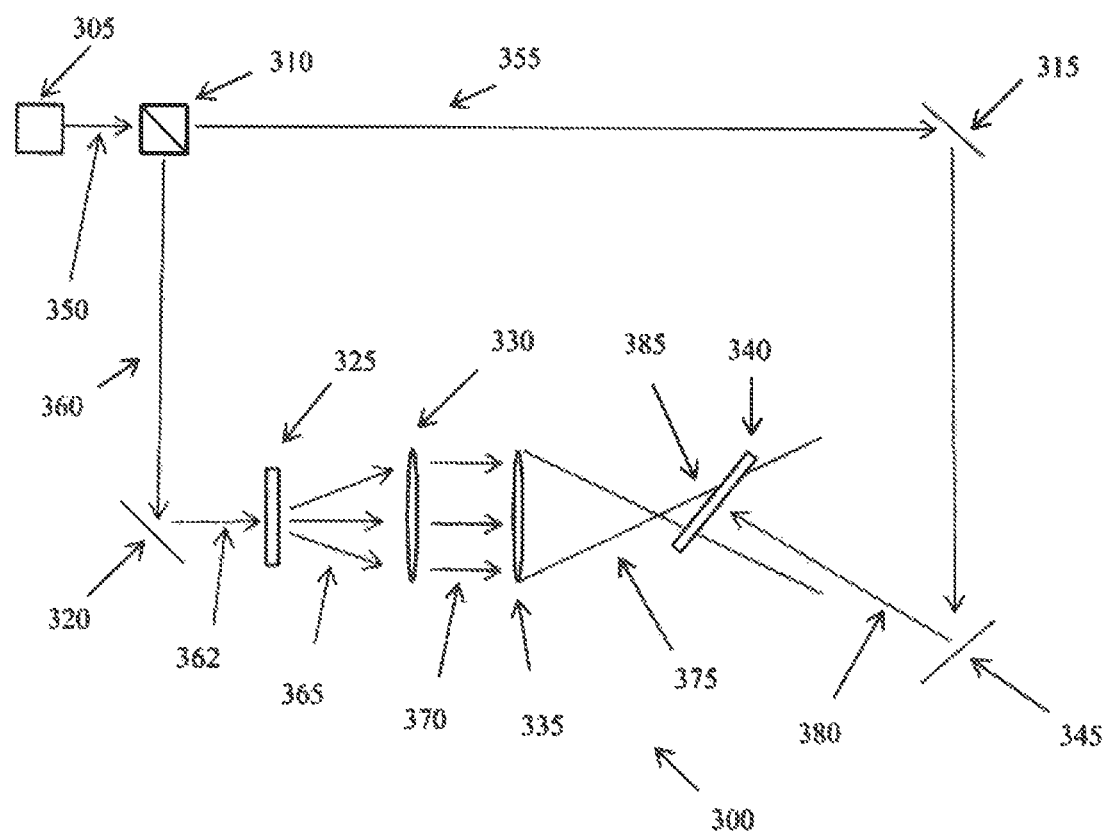
FIG. 3B is a schematic of recording a reflection type hologram.

Referring to FIGS. 2, 3A and 3B, an approach to recording the image on the HOE will be described. In FIG. 2, a reference beam is represented at 40 and labeled "Reference" and an object beam is represented at 42 and labeled "Object".

The HOE is an optical element (such as a lens, filter, beam splitter, or diffraction grating), i.e., produced by using holographic imaging process or principles. Generally, two beams from a light source, e.g. laser beam, are interfering in recording materials. One beam is an object beam reflected or scattered from an object to be recorded, and another beam is a reference beam. The object beam and the reference beam intersect and interfere with each other to record an interference pattern in the recording materials. This interference pattern records the information of the object on a HOE. In sighting devices used for weapons or optical devices, the HOE may be used to reconstruct the recorded image of a reticle such that a user may view the reticle superimposed on a target. The user of the weapon or optical device views the target through the HOE, which requires that the HOE be of certain dimension to enable the user's eye to view the target through the HOE.

A holographic optical element (HOE)/diffractive optical element (DOE) is disposed in the path of the light beam, which reconstructs an image of a reticle. As used herein, a diffractive optical element (DOE) is an optical element that primarily relies on the principle of diffraction i.e. if a DOE is illuminated with a light beam, a DOE shapes or modifies the incident light beam by diffraction. Non-limiting examples of the DOE include Kinoform optical elements or Binary optical elements that are made by structures that have an approximate shape of a desired/ideal surface; Holographic Optical Elements (HOE)—discussed below; Hybrid lenses that have a combined refractive and diffractive power (e.g. Canon lens); Computer Generated Holograms (CGHs), wherein a hologram may be printed by a laser using a computer; Gratings that may be made by an etching process (e.g. Ruled or Machined gratings); and Grating Prisms (GRISMs) that are a combination of a prism and grating arranged so that the incident light at a chosen central wavelength passes straight through. Since a mirror does not diffract the incident light beam, a mirror is not a diffractive optical element.

A holographic optical element (HOE) is a type of DOE and is defined as an optical element (such as a diffractive lens, filter, beam splitter, or diffraction grating) that is produced using holographic imaging processes or principles. The HOE may be made by interfering light beams and recording the interference pattern on a suitable media. The HOEs thus manufactured are generally clear enough to allow a user to view an object through the HOE, e.g. to view a target through the HOE. The definition of a HOE also includes a binary optical element e.g. computer generated holograms. Computer-generated holography (CGH) is a method of digitally generating holographic interference patterns. A holographic image may be generated with a computer simulation without generating an actual interference. A holographic interference pattern is digitally computed and printed onto a medium e.g. a mask or film, for subsequent illumination by a suitable light source. The DOE may be manufactured by the CGH method if the fringe pattern is created one pixel at a time. According to one method, the fringe pattern may be digitally transferred to shims that may be used to stamp all the HOEs. These HOEs may be stamped either as a reflection type HOE or a transmission type HOE. Unlike the above-discussed HOEs made by the interfering light beams, the stamped HOEs are typically not clear enough to allow the user to view an object through the stamped HOE. CGH allows manufacturing HOEs without a need to record each holographic optical element individually. If an element that diffracts light is made by light interference in a medium it is generally called a HOE. The method of digitally generating holographic interference patterns is also called computer generated holography (CGH) because it started from the simulation of holograms by computer. The term DOE and HOE may generally be used interchangeably. Embodiments according to the present disclosure may use a DOE or HOE interchangeability.

The present disclosure proposes an arrangement, wherein the user views the reconstructed image generated by the HOE through another optical element i.e. a non-diffraction optical element (NDE), which may consist of a partial mirror, glass or an element with a dichroic film coating. As used herein, a NDE is defined as an optical element for redirecting a pattern of a light beam while preserving wavefront and fringe characteristics. As such, a NDE is not a DOE or HOE. When the HOE or DOE reconstructs the image of a reticle, this image may be reflected in or by a NDE in certain embodiments. Thus, the NDE may serve two functions for such a sight. The NDE reflects the image such that it may be viewed by the user's eye. Additionally, the user may view a target through the same NDE such that the reticle is superimposed on the target. This facilitates the user for aiming the weapon or optical device. Therefore, the user views the reticle and the target through the NDE.

Certain NDEs primarily rely on the principle of refraction. The index of refraction "n" is a function of wavelength of an incident light beam. Non-limiting examples of a refractive NDE include Conventional lenses; Compound lenses; Gradient-index (GRIN) lenses that are produced by a gradual variation of the refractive index of a material; Prisms that are used to disperse light beams; Optical fibers that are flexible and transparent fibers made by drawing glass or plastic; Optical Waveguides e.g. total internal reflection mirrors; Axicon, Spherical, or Cylindrical lenses e.g. one dimensional or other shaped lenses; and Fresnel lens. Most NDEs e.g. compound lenses, except prisms, are made to compensate for any wavelength change in the incident light beam and are said to be achromats.

As shown in FIG. 1B, a holographic optical element H is illuminated by an incident beam, which is split into many orders by the optical element. The split beams are represented as plus and minus orders i.e. "+2", "+1", "0", "−1", and "−2". The split beams may have a different number of orders than shown in FIG. 1B depending on the properties of the incident beam and the optical element. The split beams may be represented by a nomenclature other than the plus-minus nomenclature.

Zero-order transmission is a non-diffracted order, also known as a through beam because the beam passes through an optical element without any deviation i.e. emerges undeviated after passing through the optical element. According to FIG. 1B, "0" order (zero order) beam is a through beam, whereas the plus or minus beams are the diffracted beams. Although, zero order beams are commonly used in inline or Gabor hologaphy, both zero order or higher, order beams may be used in a DOE and/or HOE (off axis holography).

The DOE reconstructs the image of the reticle and projects it as a diverging or collimated light beam on a NDE. This image may be reflected in or by the NDE. The NDE reflects the image such that it may be viewed by a user's eye. Additionally, a user may view a target through the same NDE such that the reticle is superimposed on the target. This facilitates a user for aiming the weapon or optical device. The user views the reconstructed image of the reticle directly or indirectly through the above-discussed NDE. For simplicity, the NDE through which the user views the reticle may be called an optical viewing element. Because the user is not viewing the reticle directly through the DOE, the size of the DOE may be about $\frac{1}{5}^{th}$ to $\frac{1}{30}^{th}$ the size (i.e., height, width and/or area) of the optical viewing element. In some embodiments, the size of the DOE may be about 20% to 80% the size (i.e., height, width and/or area) of the optical viewing element. As the size of the DOE is small, the size of the reconstructed image generated by the DOE is also small. The size of the reconstructed image is amplified by using it as a diverging light beam at a suitable stage of an embodiment of the weapon sight or optical device. This arrangement enables the use of a small size DOE that results in space savings.

FIG. 3A shows details of a recording setup 65 for a transmission type hologram. A laser light source 42 produces a coherent light beam 46, which passes through a beam splitter 44. The beam splitter 44 splits the beam 46 into two parts. One part of the beam 46 illuminates mirror 40A that is disposed along, a reference path and the other part of the beam 46 illuminates mirror 40B disposed along the object path. Mirror 40B directs the light beam 48 onto a reticle mask and diffuser 50. A diffuser is positioned on the back of the reticle mask away from the laser beam 48 such that a diffuse beam 54 is created. The diffuse beam 54 then passes through a lens 56 that makes the mask appear to be at a predetermined distance. In one example, the lens 56 has a focal length of 300 mm that makes the mask appear to be at 100 yards. A beam 58 is output from the lens 56 and illuminates a focusing lens 60 that turns the beam 58 into a converging beam 66. The focusing power of the focusing lens 60 should generally match the parabolic reflector with which the recorded HOE 62 is to be used. Mirror 40A reflects the other part of the beam 46 onto mirror 40C, which illuminates HOE 62 with the reference beam 68. The HOE 62 is posited near the focus of the converging object beam 66 such that a diverging beam 64 is recorded onto the HOE 62 in the presence of reference beam 68. The recorded hologram 62 may be used as HOE 30 in FIG. 2. It should be understood that the recording setup 65 is merely illustrative, and other recording configurations for the transmission type hologram are contemplated without departing from the scope of the present disclosure.

If a hologram is made with a reference path beam and an object path beam, and both the beams have an angle between them, the hologram is a first order or off-axis hologram and is also known as Leith Upatnieks hologram. When a light beam is incident upon the off-axis hologram, part of this beam may pass directly through the hologram and be referred to as a zero-order beam. This zero-order beam does not contain, image information. A part of the incident light beam is diffracted as a non-zero beam, which is a copy of the object path beam and contains the image information (i.e. the reticle).

If the angle between the reference path beam and the object path beam is zero, it is known as a zero-order hologram. The zero-order hologram is also known as Gabor hologram. In the zero-order hologram, the non-diffracted readout/reference beam overlaps with the object path beam. The overlap of non-diffracted readout/reference beam, which does not contain image information, is combined with the reconstructed object beam causing a loss of clarity. This can be avoided in the off-axis hologram because the incident light beam splits in the form of the zero-order beam and the non-zero beam.

FIG. 3B shows details of a recording setup 300 for a reflection type hologram. A laser light source 305 produces a coherent light beam 350, which passes through a beam splitter 310. The beam splitter 310 splits the beam 350 into two parts. One part of the beam 355 illuminates mirror 315 that is disposed along a reference path and the other part of the beam 360 illuminates mirror 320 disposed along the object path. Mirror 320 directs the light beam 362 onto a reticle mask and diffuser 325. A diffuser is positioned on the back of the reticle mask away from the laser beam 362 such that a diffuse beam 365 is created. The diffuse beam 365 then passes through a lens 330 that makes the mask appear to be at a predetermined distance. In one example, the lens 330 has a focal length of 300 mm that makes the mask appear to be at 100 yards. A beam 370 is output from the lens 330 and illuminates a focusing lens 335 that turns the beam 370 into a converging beam 375. The focusing power of the focusing lens 335 should generally match the parabolic reflector with which the recorded HOE 340 is to be used. The HOE 340 has a first surface and an opposing second surface. Mirror 315 reflects the other part of the beam 355 onto mirror 345, which illuminates the second surface of the HOE 340 with the reference beam 380. The HOE 340 is posited near the focus of the converging object beam 375 such that a diverging beam 385 is recorded onto the HOE 340 while the reference beam 380 illuminates the HOE 340. The recorded hologram 340 may be used as a HOE in some embodiments of this disclosure where a reflection type HOE is used. It should be understood that the recording setup 300 is merely illustrative, and other recording configurations for the reflection type hologram are contemplated without departing from the scope of the present disclosure.

As discussed above, the parabolic reflector sight 50 of FIG. 2 has the parabolic reflector 32. It is understood that the parabolic reflector 32 is only partially reflective in order to allow the user 34 to view the target. (not shown) through the parabolic reflector 32. The parabolic reflector 32 reflects the image of the reticle so that it is visible to the user 34 and appears to be overlaid on the target view. In some examples, parabolic reflector 32 has a dichroic film that reflects a percentage of the object diverging beam 38. In one non-limiting example, the parabolic reflector 32 has a 650-700 nm reflection filter, which allows 400-650 nm to pass through the filter. Similarly, the parabolic reflector 32 may also be more reflective to certain wavelengths, such as wavelengths approximately the same as the wavelengths produced by the light source and/or in the reconstructed image of the reticle. Such a bandpass reflector may be more transparent to wavelengths other than those of the reticle and therefore the target image remains highly visible. Other embodiments described in this disclosure may also have such a bandpass reflector. In some embodiments, HOE 30 and/or parabolic reflector 32 may be movable to make adjustments for windage and/or elevation errors. Other embodiments may also have similar adjusting arrangements for windage and/or elevation errors.

Figure 4A:
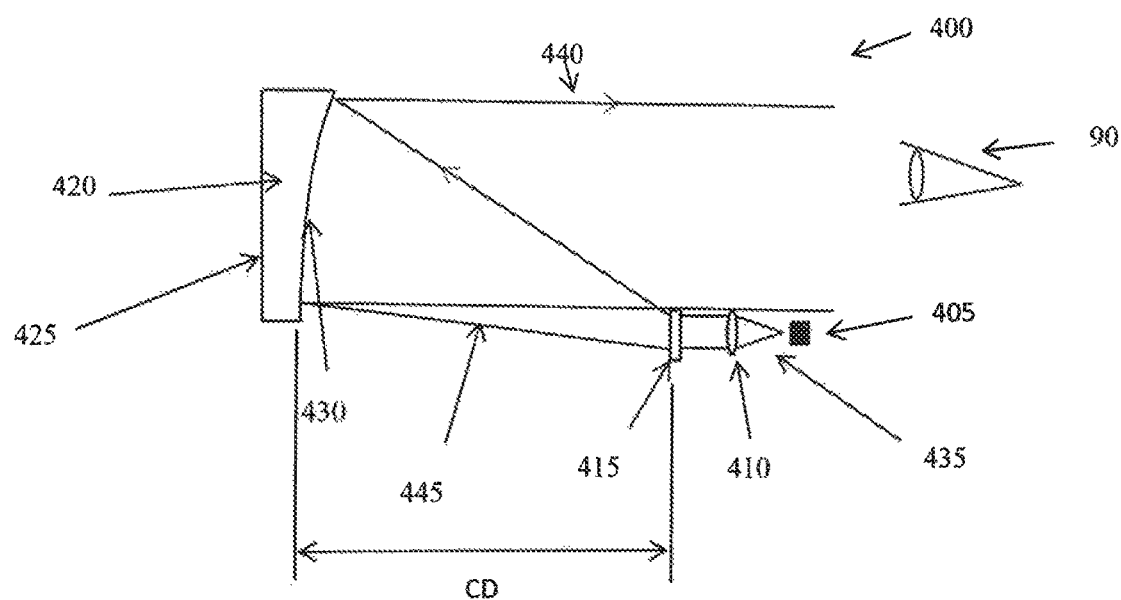
FIG. 4A is a schematic of an embodiment of a parabolic reflector sight with a transmission type diffractive optical element (DOE)

FIG. 4A shows portions of an embodiment of a parabolic reflector sight 400 and is similar to the sight 50 of FIG. 2. The parabolic reflector sight 400 has a light source 405 that illuminates a lens 410. The lens 410 may be an aspheric lens. The light source 405 may be a LED or VCSEL. A light beam 435 from the light source 405 passes through the lens 410 and focuses on a transmission type DOE 415. The transmission type DOE 415 may be recorded by using the recording setup 65 of FIG. 3A. Some embodiments may have a normal lens 410 i.e., non-aspheric lens to focus the light beam 435 on the transmission type DOE 415. In some embodiments, the light source 405 may be a laser diode that illuminates a pair of anamorphic prism or cylindrical lenses to generate a round symmetric beam. The round symmetric beam illuminates the transmission type DOE 415. These embodiments may not have the lens 410. DOE 415 reconstructs an image of the reticle and reconstructs a light beam 445 on a clear parabolic reflector/collimator 420. The DOE 415 is positioned near the focal point of the parabolic reflector 420. In a non-limiting embodiment, a distance CD between the DOE 415 and the clear parabolic reflector/collimator 420 is about 50 mm. As used herein, "clear" means the parabolic reflector/collimator 420 reflects a percentage of light or acts as a bandpass reflector that is more transparent to wavelengths other than those of the reticle such that a user 90 is able to see through the parabolic reflector/collimator 420 to view a target (not shown). In other embodiments of the present disclosure, where a DOE reconstructs an image of a reticle and projects that image on a parabolic reflector/collimator, the DOE is generally positioned near a focal point of the parabolic reflector/collimator. The clear parabolic collimator 420 has a first surface 430 and a second surface 425. The first surface 430 is parabolic and partially reflects the light beam 445 such that a reflected light beam 440 is collimated. The second surface 425 may be curved in some embodiments whereas the second surface 425 in other embodiments may not be curved. Similarly, in other embodiments of the present disclosure, one surface of the parabolic reflector/collimator is parabolic, but the other opposing surface may not be curved. The light beam 445 is projected onto the first surface 430 of the parabolic collimator 420. The light beam 445 is angled upwardly with respect to the light beam focused on the DOE 415. In some embodiments, the light beam 445 is straight or angled downwardly with respect to the light beam focused on the DOE 415 with a corresponding change in the position of the parabolic collimator 420. Thus, a light beam projected upon a parabolic reflector/collimator of any embodiment according to this disclosure has an incident angle and the parabolic reflector/collimator reflects that light beam at a reflection angle, such that the incident angle is different from the reflection angle. The parabolic reflector 420 reflects the image of the reticle 440 so that it is visible to the user 90 and appears to be overlaid on the target (not shown). Similar to the parabolic reflector 32 of FIG. 2, parabolic collimator 420 may have a dichroic film, for reflecting a percentage of light or may act as a bandpass reflector that is more transparent to wavelengths other than those of the reticle. In other non-limiting embodiments, the user views the target through optical elements such as a parabolic reflector/collimator, dichroic optical element etc., and these optical elements have a dichroic film for reflecting a percentage of light or may act as a bandpass reflector that is more transparent to wavelengths other than those of the reticle. In some embodiments, the light source 405, lens 410, DOE 415, and/or parabolic collimator 420 may be movable to make adjustments for windage and/or elevation errors.

Figure 4B:
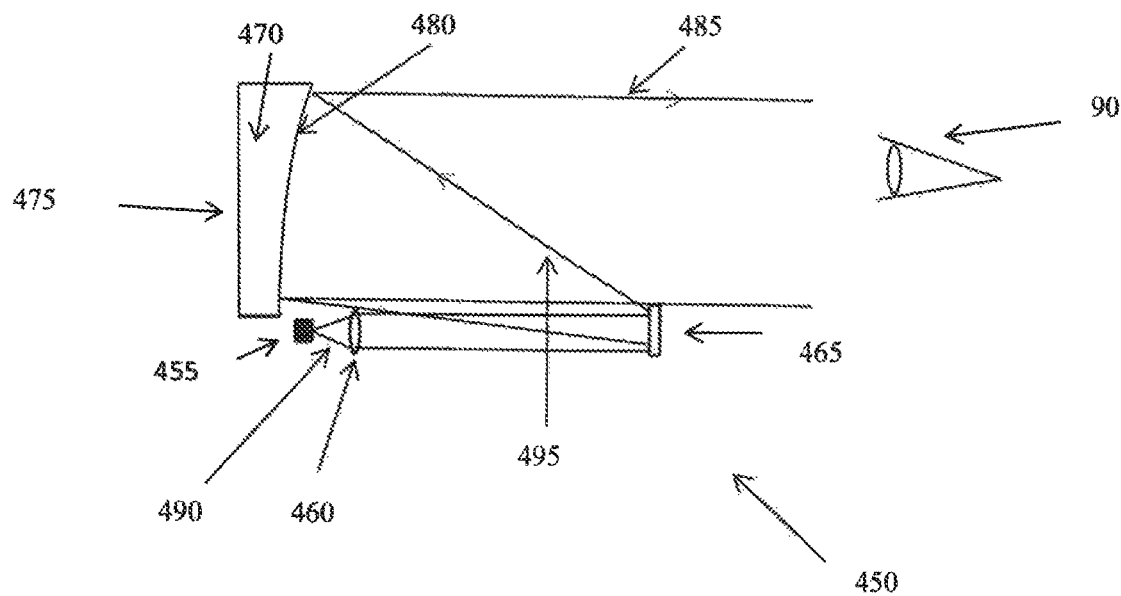
FIG. 4B is a schematic of an embodiment of a parabolic reflector sight with a reflection type DOE.

FIG. 4B shows portions of another embodiment of a parabolic reflector sight 450 with a reflection type DOE 465. The reflection type DOE 465 may be recorded by using the recording setup 300 of FIG. 3B. The parabolic reflector sight 450 has a light source 455 that illuminates a lens 460. The light source 455 may be a LED or VCSEL. The light beam 490 from the light source 455 passes through the lens 460, which focuses the light beam on a reflection type DOE 465. In some embodiments, the light source 455 may be a laser diode that illuminates a pair of anamorphic prism or cylindrical lenses to generate a round symmetric beam. The round symmetric beam illuminates the reflection type DOE 465. These embodiments may not have the lens 460. DOE 465 reflects a reconstructed image 495 of the reticle toward a clear parabolic collimator/reflector 470. Some embodiments may have a normal lens 460 i.e. non-aspheric lens to focus the light beam 490 on the reflection type DOE 465. The parabolic reflector has a first surface 480 and a second surface 475. The first surface 480 is parabolic and partially reflects the light beam 495 such that a reflected light beam 485 is collimated. The second surface 475 may be curved in some embodiments whereas the second surface 475 in other embodiments may not be curved. The light beam 495 is incident onto the first surface 480 of the parabolic collimator 470. The light beam 495 is angled upwardly with respect to the light beam focused on the DOE 465. In some embodiments, the light beam 495 is straight or angled downwardly with respect to the light beam focused on the DOE 465 and the position of the parabolic collimator 470 is correspondingly changed. The parabolic reflector 470 reflects the image of the reticle 485 so that it is visible to the user 90 and appears to be overlaid on the target (not shown). As discussed above in regards to FIG. 4A, parabolic collimator 470 may have a dichroic film or may act as a bandpass reflector. Similar to FIG. 4A, in some embodiments of FIG. 4B, the optical elements may be used to make adjustments for windage and/or elevation errors.

Figure 4C:
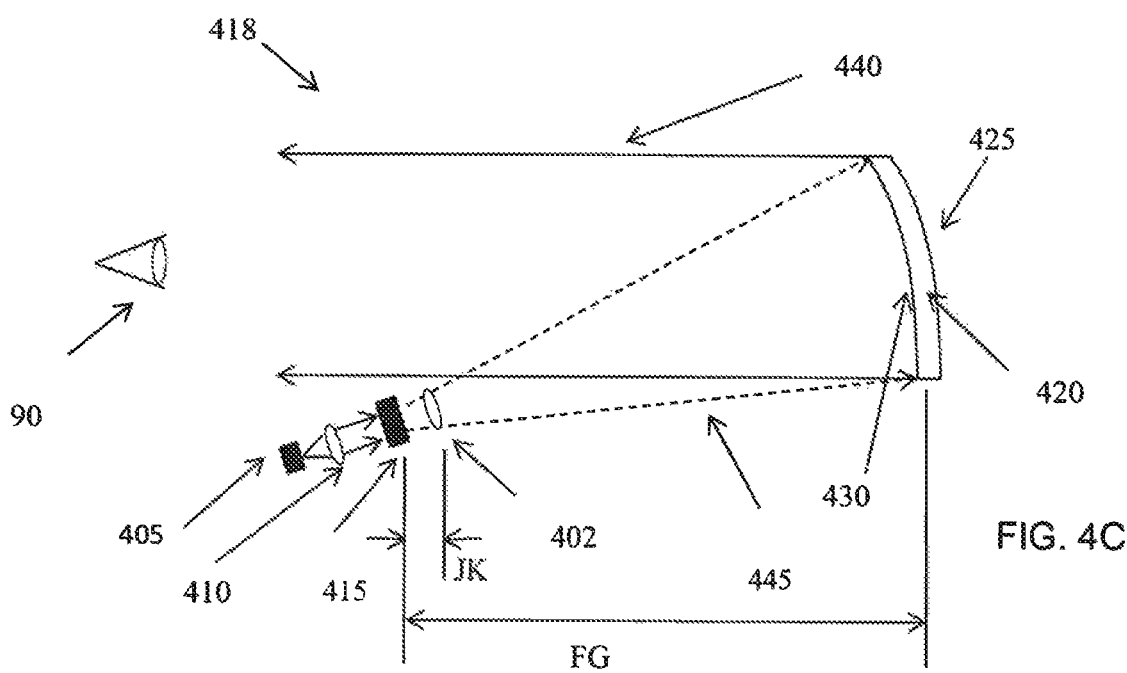
FIG. 4C is a schematic of an embodiment of a parabolic reflector sight with an adjustment optical element.

FIG. 4C shows portions of a parabolic reflector sight 418 that is similar to the parabolic reflector sight 400 of FIG. 4A with an additional adjustment optical element 402. The parabolic reflector sight 418 has a light source 405 that illuminates an lens 410. The light source 405 may be a LED or VCSEL. A light beam from the light source 405 passes through the lens 410 and focuses on a transmission type DOE 415. The transmission type DOE 415 may be recorded by using the recording setup 65 of FIG. 3A. Some embodiments may have a normal lens 410 i.e. non-aspheric lens to focus the light beam from the light source 405 on the transmission type DOE 415. In some embodiments, the light source 405 may be a laser diode that illuminates a pair of anamorphic prism or cylindrical lenses to generate a round symmetric beam. The round symmetric beam illuminates the transmission type DOE 415. These embodiments may not have the lens 410. The DOE 415 reconstructs an image of the reticle and illuminates the adjustment optical element 402. In some embodiments, the adjustment optical element 402 may be a lens that focuses a light beam 445 onto a clear parabolic reflector/collimator 420. The adjustment optical element 402 may be used for focus, elevation and/or windage control that are discussed below in reference with FIG. 4D. In one example, the adjustment optical element 402 is placed at about 10 mm from the DOE 415, i.e. a distance JK is about 10 mm. In other embodiments, the distance JK may be in a range from 1 mm to 10 mm.

The DOE 415 may be positioned near the focal point of the parabolic reflector 420. In a non-limiting embodiment, a distance FG between the DOE 415 and the clear parabolic reflector/collimator 420 is about 50 mm. In other embodiments of the present disclosure, where a DOE reconstructs an image of a reticle and projects that image on a parabolic reflector/collimator, the DOE is generally positioned near a focal point of the parabolic reflector/collimator. The clear parabolic collimator 420 has a first surface 430 and a second surface 425. The first surface 430 is parabolic and partially reflects the light beam 445 such that a reflected light beam 440 is collimated. The second surface 425 may be curved in some embodiments whereas the second surface 425 in other embodiments may not be curved. Similarly, in other embodiments of the present disclosure, one surface of the parabolic reflector/collimator is parabolic, but the other opposing surface may not be curved. The light beam 445 is projected onto the first surface 430 of the parabolic collimator 420. The parabolic reflector 420 reflects the image of the reticle 440 so that it is visible to the user 90 and appears to be overlaid on the target (not shown). Similar to the parabolic reflector 32 of FIG. 2, parabolic collimator 420 may have a dichroic film for reflecting a percentage of light or may act as a bandpass reflector that is more transparent to wavelengths other than those of the reticle. In other non-limiting embodiments, the user views the target through optical element such as a dichroic optical element that have a dichroic film for reflecting a percentage of light or may act as a bandpass reflector that is more transparent to wavelengths, other than those of the reticle. In some embodiments, the light source 405, lens 410, DOE 415, adjustment optical element 402, and/or parabolic collimator 420 may be movable to make adjustments for windage and/or elevation errors. The parabolic reflector sight 418 of FIG. 4C has a zero order DOE 415. Thus, the light beam 445 emerges un-deviated as a through beam after passing through the DOE 415. The beam includes the reconstructed reticle and may include a portion of the light beam from the source 405, which may appear as an illuminated center dot visible to the user. In some embodiments of the parabolic reflector sight 418, the DOE 415 reconstructs the image of the reticle and projects the beam towards the adjustment optical element 402 such that the light beam 445 is projected at an upward or downward angle with respect to the light beam incident on the DOE 415. In these embodiments, corresponding change in the positions of the lens 410 and parabolic reflector/collimator 420 is also made such that the lens 410 and parabolic reflector/collimator 420 are disposed in the upwardly or downwardly angled path of the light beam 445.

Figure 4D:
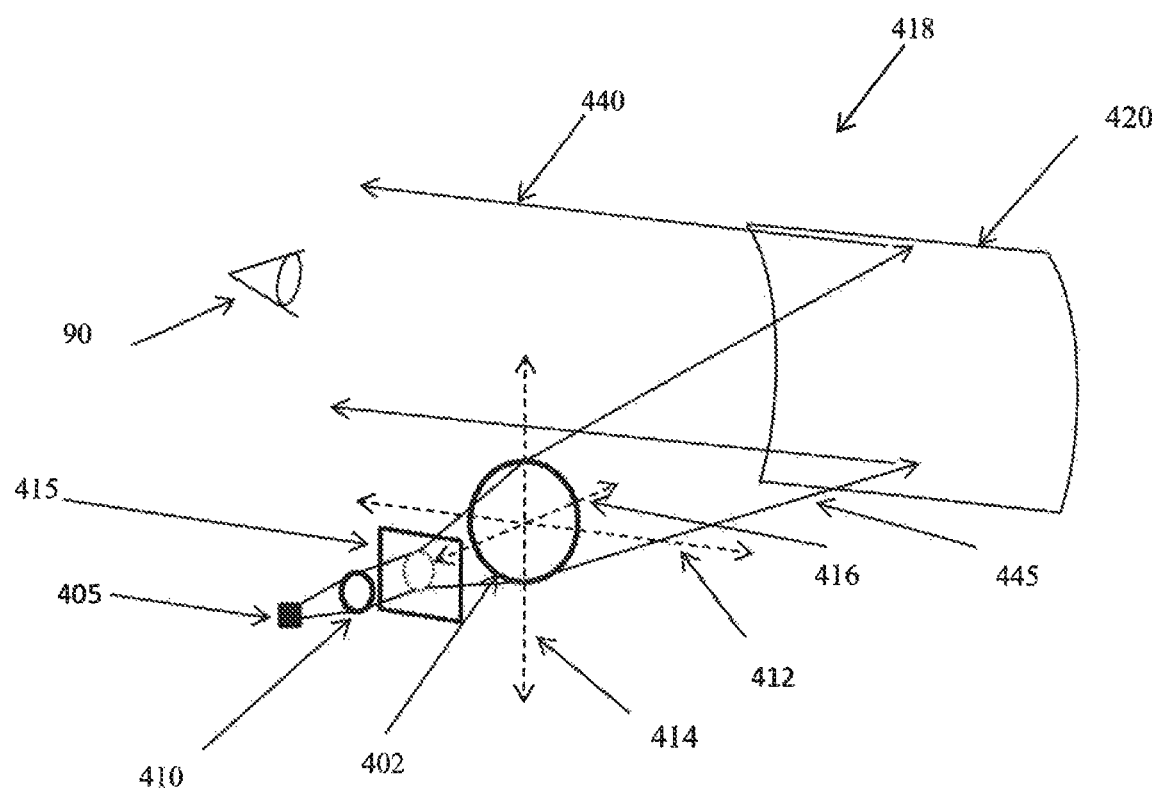
FIG. 4D is a perspective view of the embodiment in FIG. 4C.

FIG. 4D is a perspective view of the embodiment in FIG. 4C. Details of the parabolic reflector sight 418 are discussed above in reference to FIG. 4C. As discussed above, the adjustment optical element 402 may be used for focus, elevation and/or windage control. The adjustment optical element/focusing lens 402 may be moved along a X-axis 412, Y-axis 414, and Z-axis 416 to control windage, elevation and focusing variations. The movement of the focusing lens 402 along the Z-axis 416 changes the radius of curvature and an imaging depth of the light beam 445 that allows focusing the image of the reticle in a range from 1 meter to infinity i.e. >100 meters. The arrangement in FIG. 4D enables the user to make all the three adjustments by moving a single optical element and provides a compact set-up for the parabolic reflector sight 418. An adjustment optical element/focusing lens may be used in any embodiment of the parabolic reflector sight described herein to enable the user to make all three adjustments.

Figure 5:
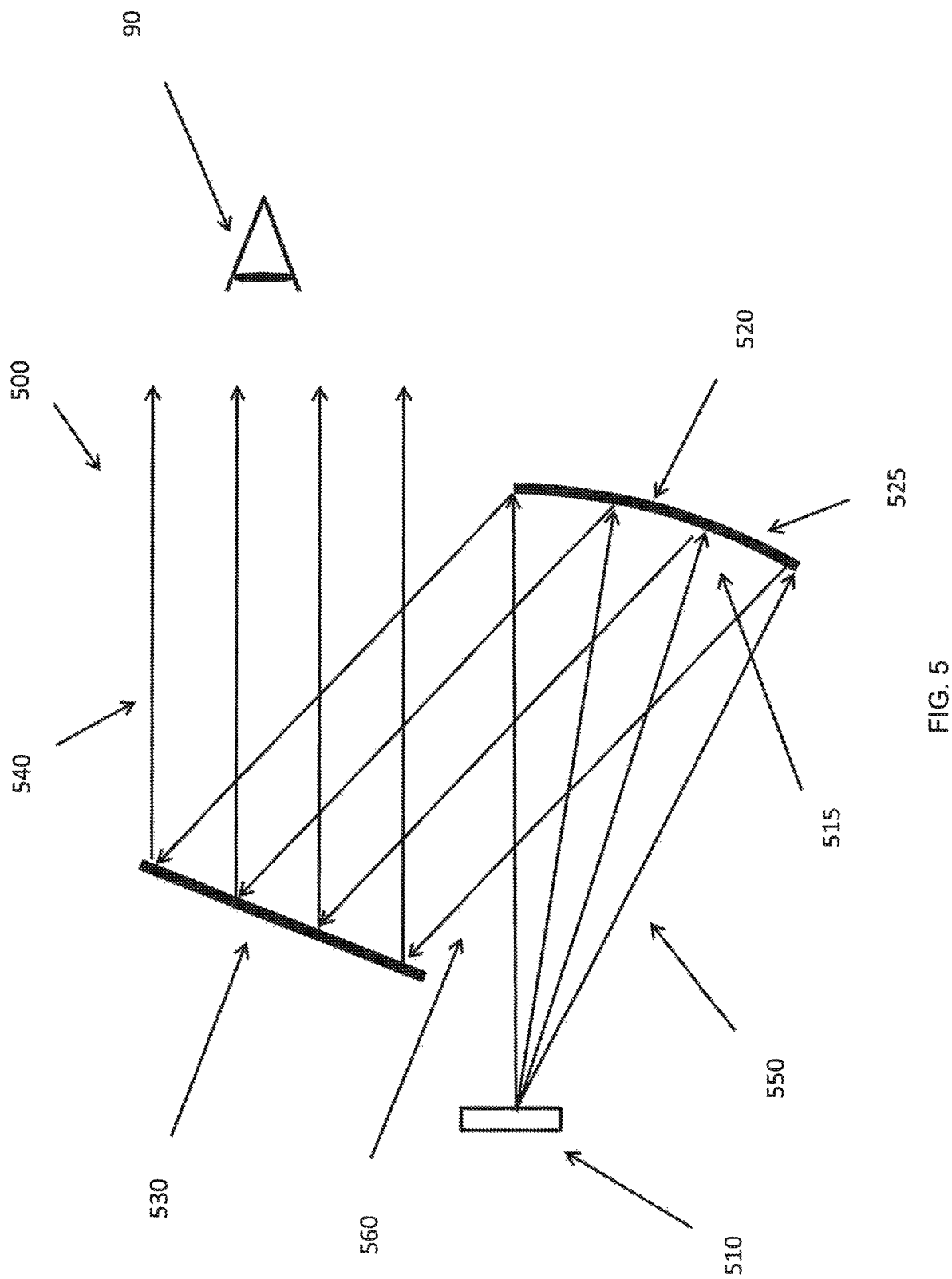
FIG. 5 is a schematic of another embodiment of a parabolic reflector sight.

FIG. 5 shows portions of another embodiment of a parabolic reflector sight 500 with a transmission type DOE 510. The parabolic reflector sight 500 has a light source (not shown) that illuminates the DOE 510. The light source may be a LED or VCSEL. As discussed above in FIGS. 4A-4C, the light source may use a lens, or a pair of anamorphic prism/cylindrical lenses to generate a light beam for illuminating the DOE 510. DOE 510 reconstructs an image of the reticle and projects the reconstructed image 550 toward a parabolic collimating mirror 520. The parabolic collimating mirror 520 has a first surface 515 and a second surface 525. The first surface 515 is parabolic and may reflect the light beam 550 such that the reflected light beam 560 is collimated. The second surface 525 may be curved in some embodiments whereas the second surface 525 in other embodiments may not be curved. The DOE 510 projects the light beam 550 onto the first surface 515 of the parabolic collimator 520. The light beam 560 is angled upwardly with respect to the light beam 550 focused on the parabolic collimator 520, but other arrangements are possible. The parabolic collimating mirror 520 collimates the reconstructed image and reflects the collimated light 560 onto a dichroic optical element 530. The dichroic optical element 530 then reflects part of the incident light beam 540 so that it is visible to the user 90 and appears to be overlaid on the target (not shown). As discussed above in regards to FIG. 4A, the dichroic optical element may have a dichroic film or may act as a bandpass reflector. Similar to FIG. 4a, in some embodiments of FIG. 5, the optical elements may be used to make adjustments for windage and/or elevation errors.

Figure 6A:
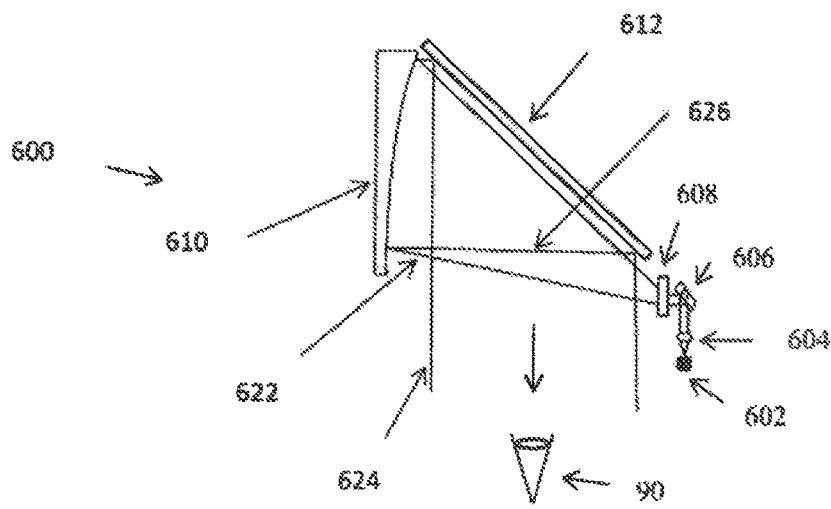
FIG. 6A is a schematic of an embodiment of a parabolic reflector sight with a transmission type DOE.

FIG. 6A shows portions of an embodiment of a parabolic reflector sigh 600 with a transmission type DOE 608. The parabolic reflector sight 600 has a light source 602 that illuminates a lens 604. The light source 602 may be a LED or VCSEL. The light beam from the light source 602 passes through the lens 604, which focuses the light beam on a mirror 606. The mirror 606 reflects the light beam onto the transmission type DOE 608. DOE 608 reconstructs an image of the reticle and projects a reconstructed image 622 toward a parabolic collimating mirror 610. The parabolic collimating mirror 610 collimates the reconstructed image 622 and reflects the collimated light 626 onto a dichroic optical element 612. The dichroic optical element 612 reflects part of a light beam 624 so that it is visible to a user 90 and appears to be overlaid on the target (not shown). As discussed above in regards to FIG. 4A, dichroic optical element 612 may have a dichroic film or may act as a bandpass reflector. Similar to FIG. 4A, in some embodiments of FIG. 6A, the optical elements may be used to make adjustments for windage and/or elevation errors.

Figure 6B:
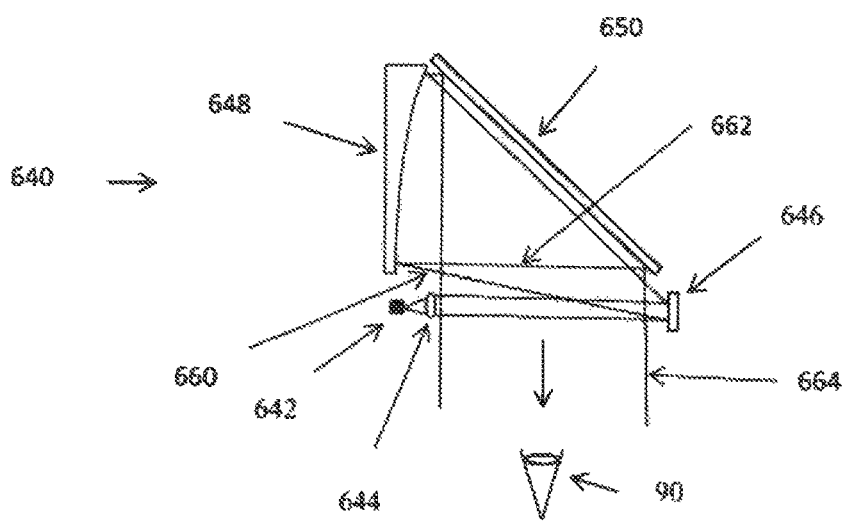
FIG. 6B is a schematic of an embodiment of a parabolic reflector sight with a reflection type DOE.

FIG. 6B shows portions of yet another embodiment of a parabolic reflector sight. 640 that has a reflection type DOE 646. The parabolic reflector sight 640 has a light source 642 that illuminates a lens 644. The light source 642 may be a LED or VCSEL. The light beam from the light source 642 passes through the lens 644, which focuses the light beam on the reflection-type DOE 646. DOE 646 reconstructs an image of the reticle and reflects the reconstructed image 660 toward a parabolic collimating mirror 648. The parabolic collimating mirror 648 collimates the reconstructed image and reflects the collimated light 662 on a dichroic optical element 650. The dichroic optical, element 650 reflects a light beam 664 so that it is visible to the user 90 and appears to be overlaid on the target (not shown). As discussed above in regards to FIG. 4A, dichroic optical element 650 may have a dichroic film or may act as a bandpass reflector. Similar to FIG. 4A, in some embodiments of FIG. 6B, the optical elements may be used to make adjustments for windage and/or elevation errors.

Figure 6C:
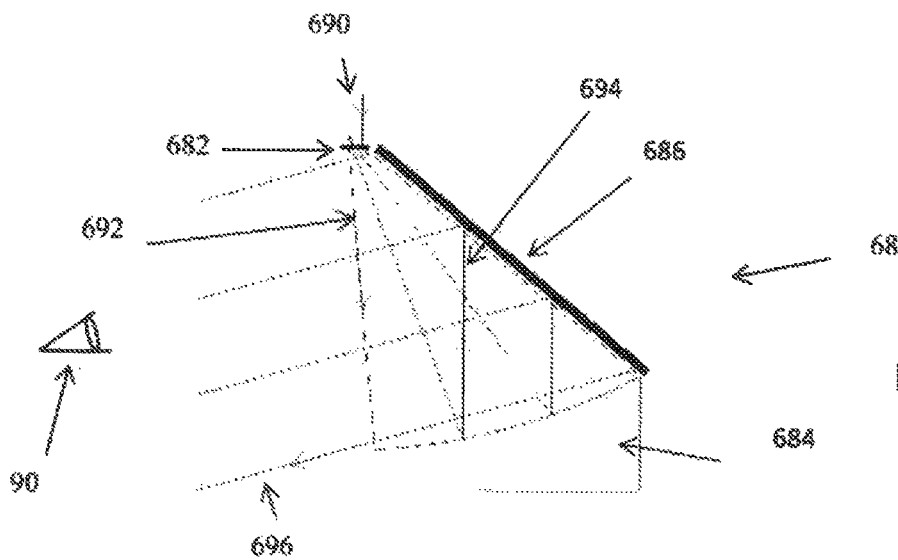
FIG. 6C is a schematic of another embodiment of a parabolic reflector sight.

FIG. 6C shows portions of another embodiment of a parabolic reflector sight 680 with a transmission type DOE 682. The parabolic reflector sight 680 has a light source (not shown) that illuminates the DOE 682. The light source may be a LED or VCSEL. DOE 682 reconstructs an image of the reticle and projects the reconstructed image 692 toward a parabolic collimating mirror 684. The parabolic collimating mirror 684 collimates the reconstructed image and reflects the collimated light 694 on a dichroic optical element 686. The dichroic optical element 686 reflects a light beam 696 so that it is visible to the user 90 and appears to be overlaid on the target (not shown). As discussed above in regards to FIG. 4A, dichroic optical element 686 may have a dichroic film or may act as a bandpass reflector. Similar to FIG. 4A, in some embodiments of FIG. 6C, the optical elements may be used to make adjustments for windage and/or elevation errors. In other non-limiting embodiments of the present disclosure, one or more of the optical elements can be moved to make adjustments for windage and/or elevation errors. In some embodiments, the parabolic collimating mirrors 610, 648 and 684 of FIGS. 6A, 6B and 6C, respectively, may be totally reflective.

Figure 7A:
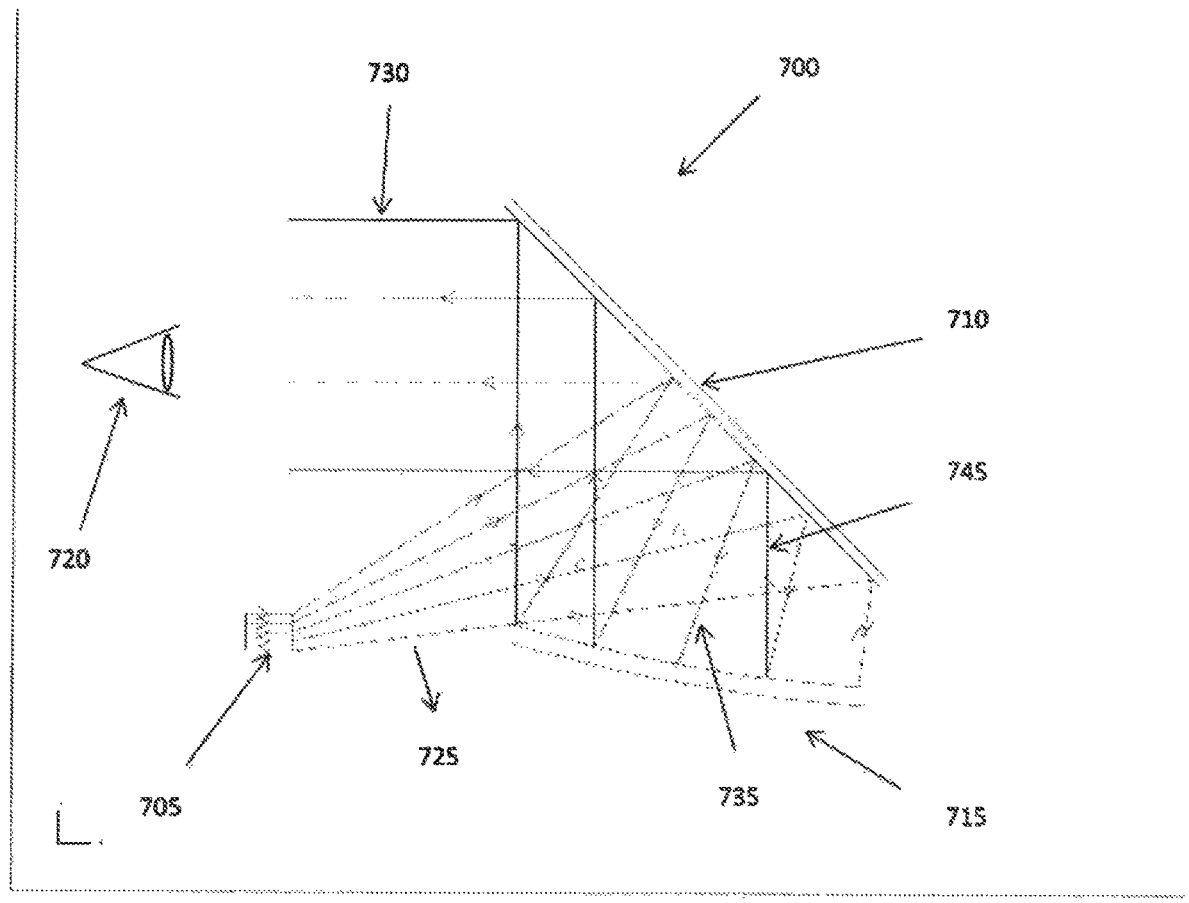
FIG. 7A is a schematic of yet another embodiment of a parabolic reflector sight.

FIG. 7A shows portions of an embodiment of a parabolic reflector sight 700. The parabolic reflector sight 700 may be enclosed in a housing (not shown) and the housing may be mounted on a weapon or instrument. A light source (not shown) projects a light beam upon a DOE 705. As discussed earlier in FIG. 3A, a recorded hologram may be used as the DOE 705. The recorded hologram may be used in other embodiments discussed in this disclosure. The light, beam passes through the DOE 705 and emerges as a diverging beam 725 illuminating a dichroic element 710. The DOE 705 may project an image of a cross hair, circle dot or other reticle shape onto the dichroic element 710. The dichroic element 710 has a generally flat surface and reflects the diverging beam 725 as diverging light beam 735 towards a parabolic reflector 715. The parabolic reflector 715 may consist of a mirror, dichroic or reflective optical element. The parabolic reflector 715 collimates the light beam and reflects the light beam 745 back at the dichroic element 710. The dichroic element 710 then reflects the collimated light beam 730 towards a user 720.

The dichroic element 710 is sensitive to an angle of the incident light beam and is selected to reflect the diverging beam 725 as well as light beam 745. The dichroic element 710 may be only partially reflective in order to allow the user 720 to view the target (not shown) through the dichroic element 710. The dichroic element 710 reflects the image of the reticle so that it is visible to the user 720 and appears to be overlaid on the target view. In some examples, the dichroic element 710 has a dichroic film that reflects a percentage of the diverging beam 725 and/or the light beam 745. In one non-limiting example, the dichroic element 710 has a 650-700 nm reflection filter, which allows 400-650 nm to pass through it. Similarly, the dichroic element 710 may also be more reflective to certain wavelengths, such as wavelengths approximately the same as the wavelengths produced by the light source and/or in the reconstructing image of the reticle. Such a bandpass reflector may be more transparent to wavelengths other than those of the reticle and therefore the target image remains highly visible. In some embodiments, the light source (not shown), DOE 705, parabolic reflector 715 and/or dichroic element 710 may be movable to make adjustments for windage and/or elevation errors. The light source of the holographic weapon sights according to FIGS. 6A, 6B, 6C and 7 may be a LED or VCSEL. As discussed above, the light source may use a lens, or a pair of anamorphic prism/cylindrical lenses to generate a round symmetric light beam for illuminating their respective DOE.

Embodiments of a holographic sight are discussed below that use a collimated light beam and an achromatic configuration to create a reticle that appears to be superimposed on a target when a user views the target through the holographic sight. The holographic sight has a parabolic collimator to collimate a diverging light beam generated by a light source, such as a regular LED, a VCSEL or a non-laser light source. Due to the position of the parabolic collimator relative to the light source, the parabolic collimator forms a collimated plane wave light beam and reflects it towards a first optical element. The wavelength of the light beam may change when the temperature of the light source varies. Collimating the light beam using the parabolic reflector reduces the dispersion effect of the light beam that occurs due to the wavelength change. However, the temperature variation of the light source still introduces some error due to the wavelength shift. The collimated light from the parabolic collimator is reflected off the surfaces of at least two optical elements (first and second optical elements) before the user views the reticle. The achromatic arrangement of the first and second optical elements compensates for the wavelength shift. The first or second optical element is a diffractive optical element (DOE) that reconstructs an image of the reticle. In some embodiments, the user views the reconstructed image of the reticle through the second optical element.

In other embodiments, the second optical element reflects the light beam to illuminate a non-diffraction element (NDE). The NDE is positioned to reflect the light beam from the second optical element at an angle away from the first and second optical elements, and toward the user's eye. This configuration allows the user to view the reconstructed image of the reticle without looking directly through the first or second optical elements, which are DOEs. Because DOEs are generally less clear optically than the NDEs, the user gets a better view of the target when viewing it through the NDE.

Figure 7B:
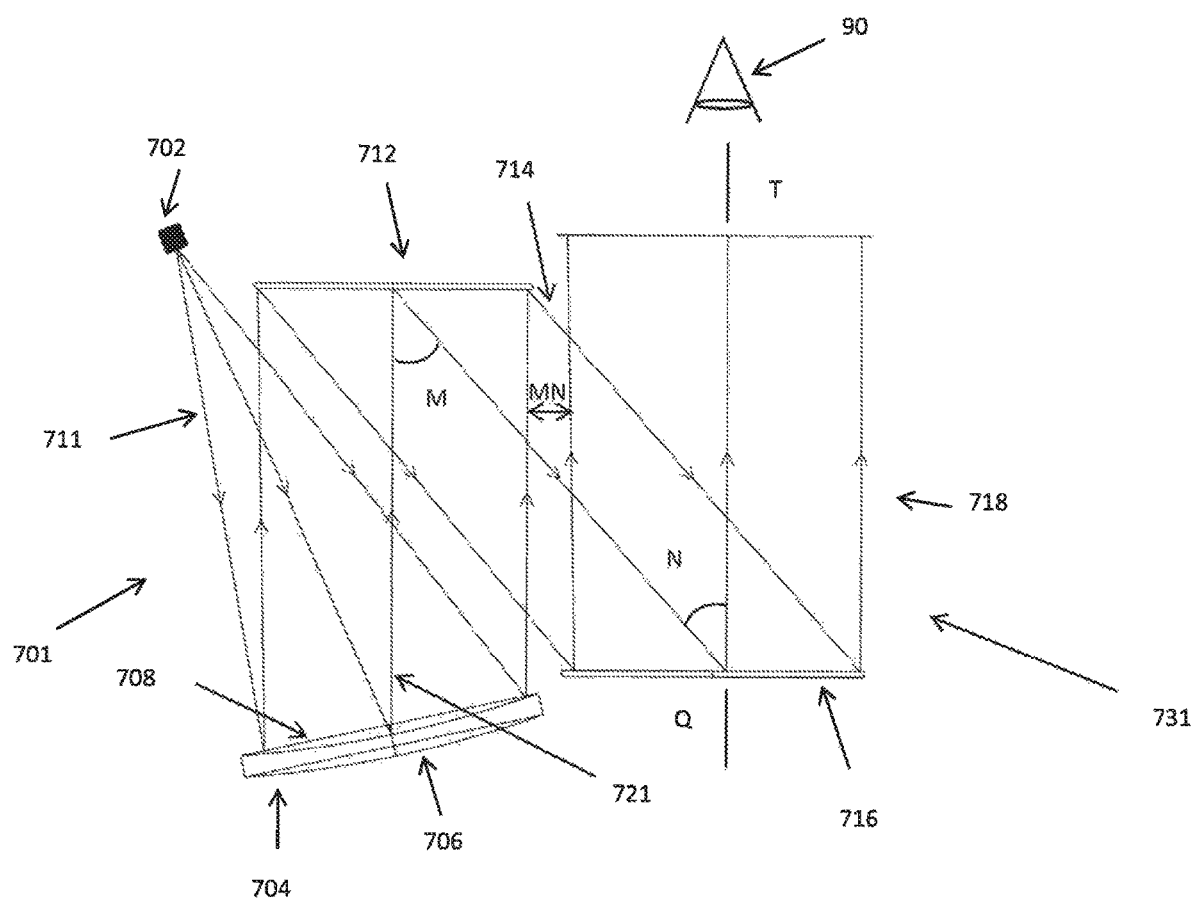
FIG. 7B is a schematic of an embodiment of an achromatic holographic sight with a parabolic collimator.

FIG. 7B shows an embodiment of an achromatic holographic gunsight 701 with a parabolic collimator enclosed in a housing 731. Other embodiments of the parabolic collimator sights according to the present disclosure may also be enclosed in their respective housings and these housings may also be attached to a weapon. Any embodiment of the parabolic collimator sight according to the present invention may have a clamp (not shown) for attaching the housing to a weapon.

The parabolic collimator sight 701 has a light source 702, The light source 702 may be non-laser based e.g. a regular LED, or a laser based light source. In some embodiments, the light source 702 may change the color and/or intensity of the generated light beam. A diverging light beam 711 from the light source 702 illuminates the parabolic collimator/reflector 704. In some embodiments, the light source 702 is positioned at or close to a focal point of the parabolic collimator/reflector 704. The parabolic collimator/reflector 104 collimates the diverging light beam 711 and transmits a collimated light beam 721 towards an optical element 712. In practice, the light source 102 may not be perfectly positioned at the focal point, which may result in a slight achromatic error due to changes in the wavelength of the light beam 711. However, in one exemplary embodiment, the error was less than 1 minute of angle (MOA), which is acceptable for certain applications. A small position change of the light source 702 may cause a slight change in collimation. This may be used to set a depth of focus of the parabolic collimator sight 701.

The parabolic collimator 704 is a full beam, collimator and generates a plane wave collimated light beam 721. The parabolic collimator 704 has a first surface 708 and a second surface 706. The first surface 708 is parabolic, while the second surface 706 may have a parabolic or non-parabolic shape. Non-limiting examples of non-parabolic shapes include slightly curved, circular, flat and oval shapes. In one embodiment, the first surface 708 may fully reflect the diverging light beam 711 in the form of collimated light beam 721. In another embodiment, the first surface may partially reflect the diverging light beam 711 in the form of collimated light beam 721 toward the optical element 712; at least part of the diverging light beam 711 passes through the parabolic collimator 704 and the remaining part of the light beam 711 is not reflected toward the optical element 712 in the form of collimated light beam 721.

According to one embodiment of the parabolic, collimator sight 701, the optical element 712 is a DOE. DOE 712 reconstructs an image of the reticle and illuminates an optical element 716 with a light beam 714. The parabolic collimator sight 701 has an angle M between the collimated light beam 721 and the light beam 714. The optical element 716 may be a reflection grating and reflect the image of the reticle 718 toward a user 90. The user 90 views the image of the reticle 718 through the reflection grating 716 and the reticle appears to be overlaid on the target (not shown). The user views the target (not shown) along the viewing axis. AB. The parabolic collimator sight 100 has an angle N between the light beam 114 and the beam 118 directed toward the user.

In an alternate embodiment, the optical element 712 may be a reflection grating and the optical element 716 is a DOE. In the alternate embodiment, the parabolic collimator 704 illuminates the reflection grating 712 with the collimated light beam 721. As discussed above, the parabolic collimator 704 may either fully or partially reflect the diverging light beam 711 in the form of the collimated light beam 721. The reflection grating 712 reflects the collimated light beam 721 and illuminates the DOE 716 in the form of the light beam 714. DOE 716 reconstructs an image of the reticle and reconstructs the image of the reticle 718 toward a user 90. The user 90 views the image of the reticle 718 through the DOE 716 and the reticle appears to be overlaid on the target (not shown). The user views the target (not shown) along the viewing axis TQ.

In a non-limiting embodiment, the optical element 716 (reflection grating/DOE) may have a height of about 1 inch or 25 mm such that the user 90 may clearly i.e. without any restriction, look at the target (not shown) along a viewing path TQ. In other embodiments, the optical element 716 may have a different predetermined height based on the user's anatomy and/or other dimensions of the parabolic collimator sight 701. The viewing path TQ has a viewing end T near the user's eye and an opposing target end Q towards the target of the parabolic collimator sight 701. Each embodiment of the parabolic reflector sight discussed below has a viewing path with a respective viewing end near the user's eye and an opposing target end towards the target of the parabolic reflector sight.

A change in temperature of the light source 702 may change the light beam's 711 wavelength. Generally, a wavelength change deteriorates the quality of the image of the reticle generated by a holographic gunsight. In the parabolic collimator sight 100, the angles M and N are about equal. For example, in some embodiments the optical elements 712 and 716 are positioned such that both M and N are about 45°. In other embodiments, the optical elements 112 and 116 are positioned such that both M and N may be chosen to control a distance MN between the optical elements 112 and 116. If the angles M and N are chosen to be greater than 45°, the distance MN will increase and vice versa. The wavelength change causes a shift in the angle M in a direction. The optical elements 712 and 716 are positioned such that the optical element 716 shifts the image of the reticle 718 in an equal and opposite direction, to compensate for the wavelength change. Thus, the angles M and N remain about the same even if the wavelength of the light source 702 changes due to the temperature change or any other reason. The optical element 712 and the optical, element 716 are thus configured as a generally achromatic system/configuration.

Figure 7C:
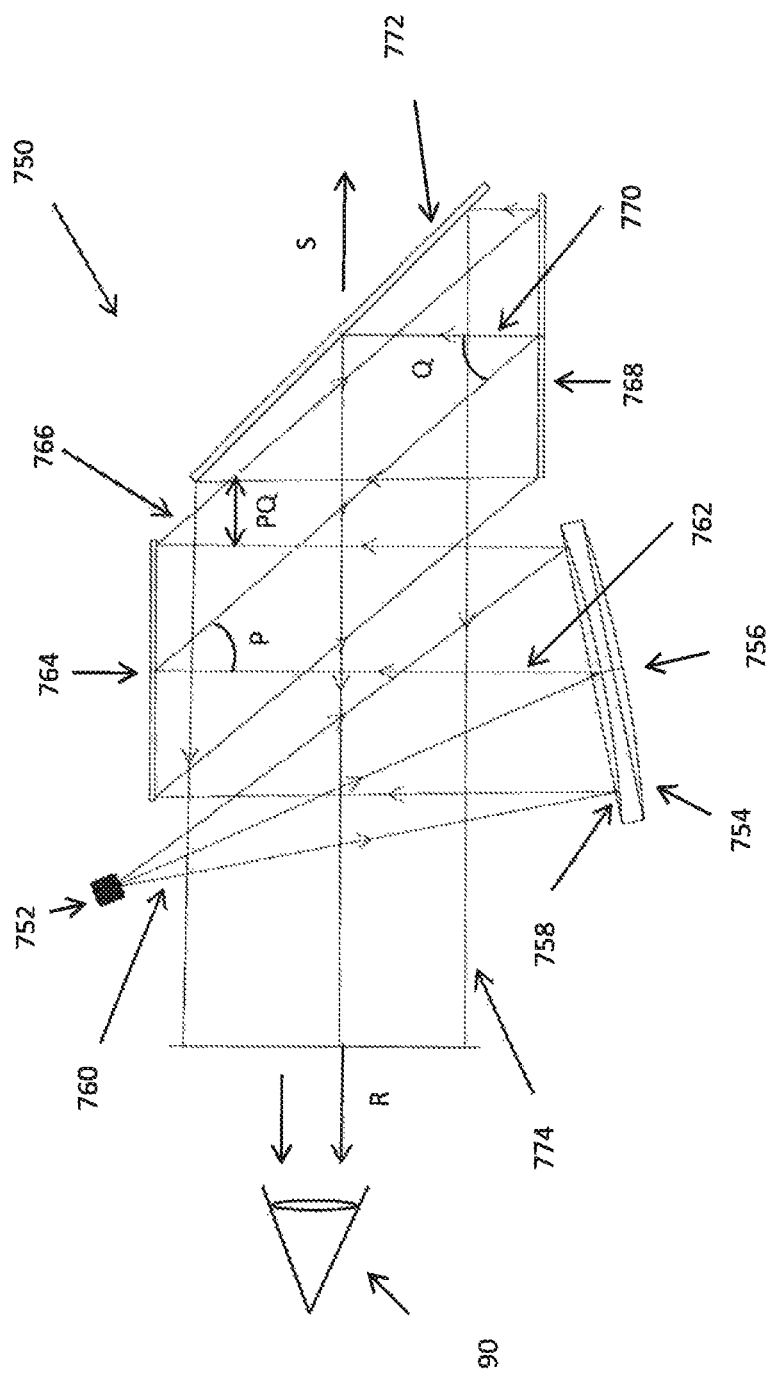
FIG. 7C is a schematic of another embodiment of an achromatic holographic sight with a parabolic collimator.

FIG. 7C shows another embodiment of an achromatic holographic gunsight 750 with a parabolic collimator. The parabolic collimator sight 750 has a light source 752. The light source 752 may be non-laser based e.g. a regular LED, or a laser based light source. In some embodiments, the light source 752 may change the color and/or intensity of the generated light beam. A diverging light beam 760 from the light source 752 illuminates the parabolic collimator/reflector 754. In some embodiments, the light source 752 is positioned at or close to a focal point of the parabolic collimator/reflector 754. The parabolic collimator/reflector 754 collimates the diverging light beam 760 and transmits a collimated light beam 762 towards an optical element 764. In practice, the light source 752 may not be perfectly positioned at the focal point, which may result in a slight achromatic error due to changes in the wavelength of the light beam 760. However, in one exemplary embodiment, the error was less than 1 minute of angle (MOA), which is acceptable for certain applications. A small position change of the light source 752 may cause a slight change in collimation. This may be used to set a depth of focus of the parabolic collimator sight 750.

The parabolic collimator 754 is a full beam collimator and generates a plane wave collimated light beam 762. The parabolic collimator 754 has a first surface 758 and a second surface 756. The first surface 758 is parabolic, while the second surface 756 may have a parabolic or non-parabolic shape. Non-limiting examples of non-parabolic shapes include slightly curved, circular, flat and oval shapes. In one embodiment, the first surface 758 may fully reflect the diverging light beam 760 in the form of collimated light beam 762. In another embodiment, the first surface may partially reflect the diverging light beam 760 in the form of collimated light beam 762 toward the optical element 764; at least part of the diverging light beam 760 passes through the parabolic collimator 754 and the remaining part of the light beam 760 is not reflected toward the optical element 764 in the form of collimated light beam 762.

According to one embodiment of the parabolic collimator sight 750, the optical element 764 is a DOE. DOE 764 reconstructs an image of the reticle and illuminates an optical element 768 with a light beam 766. The parabolic collimator sight 750 has an angle P between the collimated light beam 762 and the light beam 766. The optical element 768 may be a reflection grating and reflects the image of the reticle 770 toward an optical element 772. The optical element 772 may be a NDE. The NDE 772 reflects at least part of the image of the reticle 770 toward the user 90 in the form of a light beam 774. The user 90 views the image of the reticle 774 through the ND 772 and the reticle appears to be overlaid on the target (not shown). The user views the target (not shown) along a viewing axis RS. The parabolic collimator sight 750 has an angle P between the collimated light beam 762 and the beam 766.

In an alternate embodiment, the optical element 764 may be a reflection grating and the optical element 768 is a DOE. In the alternate embodiment, the parabolic collimator 754 illuminates the reflection grating 764 with the collimated light beam 762. As discussed above, the parabolic collimator 754 may either fully or partially reflect the diverging light beam 760 in the form of the collimated light beam 762. The reflection grating 764 reflects the collimated light beam 762 and illuminates the DOE 768 with the light beam 766. DOE 768 reconstructs an image of the reticle and directs the image of the reticle 770 toward the optical element 772. The optical element 772 may be a NDE. The NDE 772 reflects at least part of the image of the reticle 770 toward the user 90 in the form of a light beam 774. The user 90 views the image of the reticle 774 through the NDE 772 and the reticle appears to be overlaid on the target (not shown). The user views the target (not shown) along the viewing axis RS. The parabolic collimator sight 750 has an angle P between the light beam 762 and the beam 766.

The parabolic collimator sight 750 has an angle Q between the beam 766 and the beam 770. In a non-limiting embodiment, the NDE 772 may have a height of about 1 inch or 25 mm such that the user 90 may clearly i.e. without any restriction, look at the target (not shown) along the viewing path RS. In other embodiments, the NDE 772 may have a different predetermined height based on the user's anatomy and/or other dimensions of the parabolic collimator sight 750. The viewing path RS has a viewing end R near the user's eye and an opposing target end S towards the target (not shown) of the parabolic collimator sight 750.

A change in the temperature of the light source 752 may change the light beam's 760 wavelength. Generally, wavelength change deteriorates the quality of the image of the reticle generated by a holographic sight. In the parabolic collimator sight 750, the angles P and Q are about equal. For example, in some embodiments the optical elements 764 and 768 are positioned such that both P and Q are about 45°. In other embodiments, the optical elements 764 and 768 are positioned such that both P and Q may be chosen to control a distance PQ between the optical elements 764 and 768. If the angles P and Q are chosen to be greater than 45°, the distance PQ will increase and vice versa. The wavelength change causes a shift in the angle P in a direction. The optical elements 764 and 768 are positioned such that the optical element 768 shifts the image of the reticle 770 in an equal and opposite direction to compensate for the wavelength change. The angles P and Q remain about the same even if the wavelength of the light source 752 changes due to the temperature change or some other reason. The optical element 764 and the optical element 768 are thus configured as a generally achromatic system/configuration.

Figure 8A:
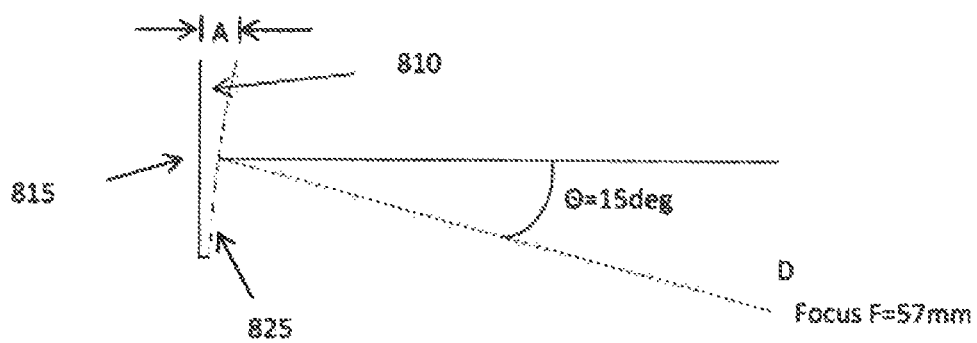
FIG. 8A shows a parabolic reflector having an angle θ of 15 degrees and Focus at 57 mm.
Figure 8B:
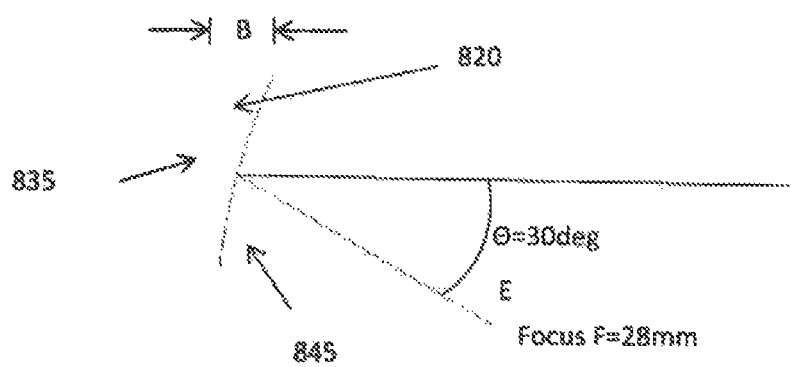
FIG. 8B shows a parabolic reflector having an angle θ of 30 degrees and Focus at 28 mm.

FIG. 8A shows a parabolic reflector 810 having an angle θ of 15 degrees between an incident and reflected ray of light beam generally at the center of the parabolic reflector. The parabolic reflector 810 has a focal point D at 57 mm. The parabolic reflector 810 has a first surface 825 and a second surface 815. The first surface 825 is parabolic whereas the second surface 815 may be curved or non-curved. The parabolic reflector 810 has a thickness A between the first surface 825 and the second surface 815. FIG. 8B shows a parabolic reflector 820 having an angle θ of 30 degrees between an incident and reflected ray of light beam generally at the center of the parabolic reflector. The parabolic reflector 820 has a focal point E at 28 mm. The parabolic reflector 820 has a first surface 845 and a second surface 835. The first surface 845 is parabolic whereas the second surface 835 may be curved or non-curved. The parabolic reflector 820 has a thickness B between the first surface 845 and the second surface 835. As the angle θ increases, the thickness of the parabolic reflector generally increases and, therefore, a parabolic reflector with an angle θ greater than 30 degrees is thicker than the parabolic reflectors 810 and 820. The material behind the first surface i.e. 825, 845 of the parabolic element may be machined to make it thinner and lighter.

Figure 8C:
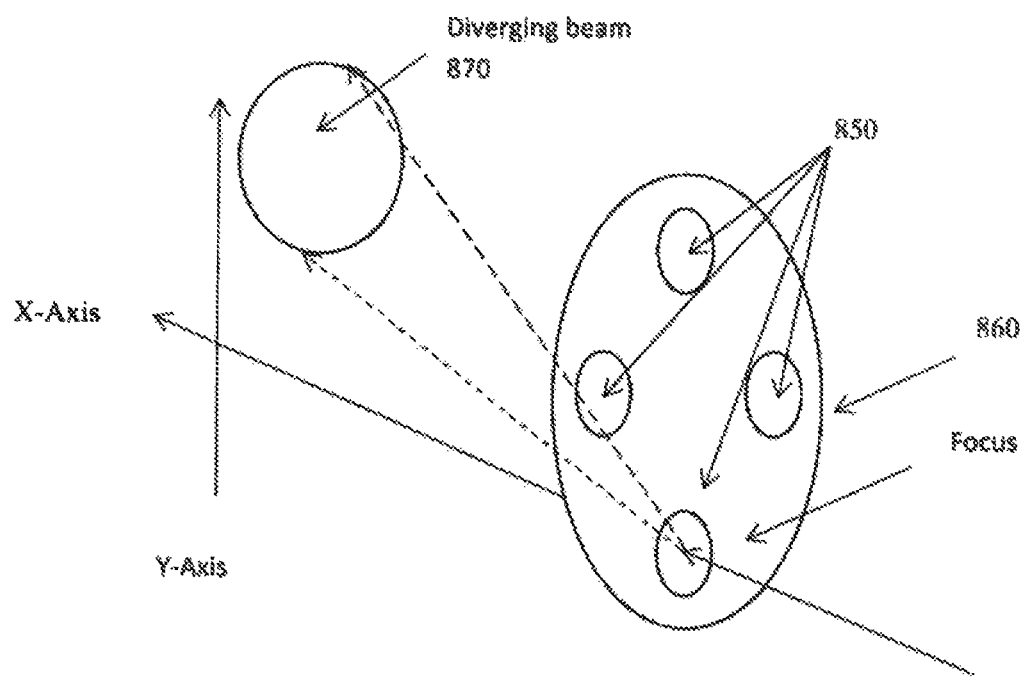
FIG. 8C shows an embodiment having four different DOES disposed on a circular rotatable element.

FIG. 8C shows four DOEs 850 attached to a circular rotatable element 860. Each DOE 850 may reconstruct an image, such as a reticle, having a different shape, appearance and/or size and these DOE 850 may be rotatably changed according to the wishes of the user. As shown, a light beam illuminates one DOE 850 that reconstructs an image and projects the reconstructed image as a diverging beam 870 toward another optical element of the embodiment. For example, HOE 30 of FIG. 2 may be substituted with DOE 850. Circular rotatable element 860 may be integrated in the parabolic reflector sight 50 such that the diverging beam 870 of the reconstructed image is projected on the parabolic reflector 32. In other embodiments, the circular rotatable element 860 may be interchangeable. In a non-limiting, embodiment, a plurality of DOEs may be disposed on a slider or slides; the slider or slides may be interchangeable.

Similarly, DOE 850 may be used in an embodiment, with necessary adjustments, instead of the transmission type DOE 415 of FIGS. 4A-4C, reflection type DOE 465 of FIG. 4B, DOE 510 of FIG. 5, transmission type DOE 608 of FIG. 6A, reflection type DOE of FIG. 6B, transmission type DOE 682 of FIG. 6C, and/or DOE 705 of FIG. 7A.

For simplicity, figures of various embodiments according to the present disclosure do not show blockage of a zero order transmission. In addition, the above-discussed embodiments having a transmission type DOE may use a reflection type DOE, by making a corresponding change in the position of other elements in that embodiment. Similarly, embodiments having a reflection type DOE may use a transmission type DOE, by making a corresponding change in the position of other elements in that embodiment. For example, the transmission type HOE/DOE 30 of the parabolic reflector sight 50 in FIG. 2 may be replaced with a reflection type HOE/DOE (not shown). The light reference beam in this modified embodiment illuminates the reflection type HOE/DOE that reconstructs an image and, reflects the image toward the parabolic reflector 32. A person skilled in the art will be able to position the optical elements of the modified embodiment to make it operable for the reflection type HOE/DOE. Similarly, transmission type DOEs 510, 682, and 705, of FIGS. 5, 6C, and 7A, respectively, may be replaced with a reflection type DOE, after making necessary adjustments in the respective modified embodiment.

It will be apparent to those skilled in the art that various modifications and variations can be made in the present disclosure without departing from the spirit or scope of the disclosures. Thus, it is intended that the present disclosure cover the modifications and variations of this disclosure. The present disclosure has been described with reference to some embodiments. However, it is realized that variants and equivalents to the preferred embodiments may be provided without departing from the scope of the disclosure as defined in the accompanying claims. It is to be understood that the detailed description of the present disclosure are exemplary and explanatory and are intended to provide further explanation of the disclosure. It is not intended to be exhaustive or to limit embodiments to the precise form disclosed. As such, this disclosure should be interpreted broadly.

The invention claimed is:

1. A holographic weapon sight, comprising:
    a housing having a viewing end and an opposing target end, a viewing path being defined from the viewing end to the target end;
    a light source operable to project a light beam along a path;
    a diffractive optical element (DOE) disposed in the path of the light beam, the DOE reconstructing an image of a reticle; and
    a parabolic reflector reflecting the image of the reticle for viewing by a user.

2. The holographic weapon sight of claim 1, wherein the DOE is selected from the group of reflection type DOE and transmission type DOE.

3. The holographic weapon sight of claim 1, further comprising a lens disposed along the path of the light beam between the light source and the DOE, the light source illuminating the lens, the lens focusing the light beam on the DOE, and the DOE reconstructing the image of the reticle.

4. The holographic weapon sight of claim 1, wherein the parabolic reflector is disposed in the viewing path such that the user views a target along the viewing path through the parabolic reflector from the viewing end.

5. The holographic weapon sight of claim 1, further comprising an adjustment optical element disposed along the path of the light beam between the DOE and the parabolic reflector, the adjustment optical element focusing the image of the reticle onto the parabolic reflector.

6. The holographic weapon sight of claim 5, wherein the adjustment optical element is a lens.

7. The holographic weapon sight of claim 5, wherein the adjustment optical element is movable along an X-axis, Y-axis and/or Z-axis for making windage, elevation and/or focus adjustments, respectively.

8. The holographic weapon sight of claim 1, wherein the image of the reticle reconstructed by the DOE is a diverging light beam.

9. The holographic weapon sight of claim 1, wherein the parabolic reflector selectively reflects wavelengths of the light source and/or the image of the reticle.

10. The holographic weapon sight of claim 1, further comprising a dichroic optical element disposed in the viewing path, the parabolic reflector reflecting the reconstructed image toward the dichroic optical element such that the user views a target along the viewing path through the dichroic optical element from the viewing end.

11. The holographic weapon sight of claim 10, further comprising a lens disposed along the path of the light beam between the light source and the DOE, and the light source illuminating the lens.

12. The holographic weapon sight of claim 11, further comprising a mirror disposed along the path of the light beam between the lens and the DOE, the light source illuminating the lens, the lens focusing the light beam on the mirror, the mirror reflecting the light beam onto the DOE.

13. The holographic weapon sight of claim 10, wherein the image of the reticle reconstructed by the DOE is a diverging light beam.

14. The holographic weapon sight of claim 10, wherein the parabolic reflector selectively reflects wavelengths of the light source and/or the image of the reticle.

15. The holographic weapon sight of claim 1, further comprising a dichroic optical element disposed in the viewing path, the parabolic reflector disposed in the light beam path, the dichroic optical element reflecting the reconstructed image of the reticle from the DOE toward the parabolic mirror, the parabolic reflector collimating the reconstructed image and reflecting the image back toward the dichroic optical element such that the user views a target along the viewing path through the dichroic optical element from the viewing end.

* * * * *